United States Patent
Xu et al.

(10) Patent No.: US 9,290,674 B2
(45) Date of Patent: Mar. 22, 2016

(54) METHOD FOR PREPARING A BASE FILM OF MODIFIED POLYVINYL ALCOHOL POLYMER

(71) Applicant: SHENZHEN CHINA STAR OPTOELECTRONICS TECHNOLOGY CO., LTD, Shenzhen (CN)

(72) Inventors: Rui Xu, Shenzhen (CN); Weiwei Zhang, Shenzhen (CN); Hongqing Huang, Shenzhen (CN); Junjie Huang, Shenzhen (CN); Quan Liu, Shenzhen (CN); Jungmao Tsai, Shenzhen (CN); Huifang Duan, Shenzhen (CN)

(73) Assignee: SHENZHEN CHINA STAR OPTOELECTRONICS TECHNOLOGY CO. LTD, Shenzhen (CN)

( * ) Notice: Subject to any disclaimer, the term of this patent is extended or adjusted under 35 U.S.C. 154(b) by 0 days.

(21) Appl. No.: 14/690,479

(22) Filed: Apr. 20, 2015

(65) Prior Publication Data

US 2015/0225592 A1 Aug. 13, 2015

Related U.S. Application Data

(63) Continuation of application No. 13/377,537, filed as application No. PCT/CN2011/080581 on Oct. 9, 2011, now abandoned.

(30) Foreign Application Priority Data

Aug. 16, 2011 (CN) .......................... 2011 1 0234045

(51) Int. Cl.
| | | |
|---|---|---|
| *B05D 3/00* | (2006.01) | |
| *B05D 5/06* | (2006.01) | |
| *C09D 129/04* | (2006.01) | |
| *G02B 1/08* | (2006.01) | |
| *C08K 9/06* | (2006.01) | |
| *B82Y 30/00* | (2011.01) | |

(52) U.S. Cl.
CPC .............. *C09D 129/04* (2013.01); *B05D 3/007* (2013.01); *B05D 5/06* (2013.01); *C08K 9/06* (2013.01); *G02B 1/08* (2013.01); *B82Y 30/00* (2013.01); *Y10T 428/31663* (2015.04)

(58) Field of Classification Search
CPC ............ B32B 9/04; C08K 9/06; B05D 3/007; B05D 5/06; C09D 129/04; G02B 1/08
See application file for complete search history.

(56) References Cited

U.S. PATENT DOCUMENTS

| | | |
|---|---|---|
| 2005/0128379 A1 | 6/2005 | Matsunaga |
| 2006/0089442 A1* | 4/2006 | Mennig et al. ................ 524/430 |
| 2006/0222815 A1 | 10/2006 | Oles et al. |

FOREIGN PATENT DOCUMENTS

| | | |
|---|---|---|
| CN | 1646948 | 7/2005 |
| CN | 1979231 | 6/2007 |
| CN | 101033320 | 9/2007 |
| CN | 101281267 | 10/2008 |
| CN | 101619138 | 1/2010 |
| CN | 101747573 | 6/2010 |
| CN | 101750638 | 6/2010 |
| JP | 60159706 | 8/1985 |
| JP | 1038702 | 2/1989 |

OTHER PUBLICATIONS

Deng Hao, Xiang Al-Min, Preparation and Property of Composite Polarizing Films of Poly(vinyl alcohol)/Nano-Silica, journal, Apr. 2008, p. 70-73, vol. 22, No. 4, China Plastics, Beijing China.

* cited by examiner

*Primary Examiner* — David W Wu
*Assistant Examiner* — Marie Reddick
(74) *Attorney, Agent, or Firm* — Mark M. Friedman

(57) ABSTRACT

The present invention provides a base film of modified polyvinyl alcohol as well as a method for preparing the base film of modified polyvinyl alcohol and a polarizer made from the base film. The method includes steps of: (1) executing surface graft modification of nano-silicon dioxide particles with fluorinated silane to obtain a modified nano-silicon dioxide powder; (2) adding the modified nano-silicon dioxide powder obtained from the step (1) to an aqueous solution of polyvinyl alcohol polymer, in order to prepare a composite solution of polyvinyl alcohol polymer; and (3) pouring the composite solution of polyvinyl alcohol polymer prepared from the step (2) onto a surface of a casting substrate to obtain a base film of modified polyvinyl alcohol (PVA). The present invention enhances the heat and humidity resistances and the stability of the PVA base film, and improves its mechanical performance and sticking-resistance.

7 Claims, 1 Drawing Sheet

METHOD FOR PREPARING A BASE FILM OF MODIFIED POLYVINYL ALCOHOL POLYMER

CROSS REFERENCE TO RELATED APPLICATIONS

This application is a continuation application of U.S. patent application Ser. No. 13/377,537, filed on Dec. 09, 2011, now abandoned, which claims the priority of PCT Patent Application No. PCT/CN2011/080581, filed on Oct. 09, 2011, the disclosure of which is incorporated herein by reference.

BACKGROUND OF THE INVENTION

1. Field of the Invention

The present invention relates to a base film of polyvinyl alcohol and more particularly to a base film of modified polyvinyl alcohol as well as its preparation method and a polarizer prepared from the base film of modified polyvinyl alcohol.

2. Description of the Prior Art

Polarizer is one of the essential important components in a liquid crystal display (LCD), and its function is to convert natural light into polarized light, in order to cooperate with liquid crystal molecules twisted to control light passing and presentation of color signals. An existing polarizer used in a LCD is mostly made of a highly oriented high polymer such as a base film of polyvinyl alcohol (PVA) as its substrate, dyed with various types of dichroic dyes, extended under a certain humidity and temperature, and then a layer of triacetate cellulose (TAC) film with high light transmission rate, excellent waterproof characteristic and a certain degree of mechanical strength is composited on each of two sides of the PVA base film, so as to prepare the polarizer. In comparing to polarizers dyed with organic dichroic dyes, iodine polarizers have become the mainstream polarizers for LCDs because of their polarization characteristic of wider range of wavelengths, higher light transmission rates and better price-performance ratios. Nevertheless, iodine polarizers are comparatively less resistant to heat and water. As liquid crystal displays are commonly applied to many products, higher durability for polarizers are also demanded. Therefore, modification of PVA base films for development of polarizers with excellent optical and durability performances for LCDs is a technical difficulty encountered currently.

Firstly, a PVA base film is swelled, soaked and dyed in iodine, and extended uniaxially; then a layer of triacetate cellulose (TAC) film is composited on each of two sides of the PVA base film, so as to prepare an iodine polarizer. PVA is a linear high molecular polymer with a plurality of —OH groups of strong polarity evenly distributed in a long molecular chain as shown in FIG. 1, therefore it has relatively strong hydrophilic property, and is less water resistant and less stable. Furthermore, iodine molecular structure is easily damaged under high temperatures and humidity, so that iodine polarizers are less humidity and heat resistant with poor mechanical performance. Generally, they may only meet testing conditions of 80° C.×500 hrs or 60° C.×90% RH×500 hrs, and may easily become warped and peeled off, resulting in limiting their application range.

Referring to FIG. 1 which shows a diagram of a molecular structure of a PVA base film of an existing iodine polarizer, wherein a TAC protection film of the iodine polarizer is not shown. A plurality of OH groups with strong polarity and hydrophilic property is evenly distributed on a surface of a polyvinyl alcohol polymer 3 of the PVA base film. And a structure of iodine molecules 2 may be easily damaged under high temperatures and humidity. Therefore, the PVA base film of the iodine polarizer is relatively less stable under high temperatures and humidity.

In order to improve the heat and humidity resistances of the PVA base film of the iodine polarizer, the PVA base film needed to be modified or cross-linked. Currently, a method for improving the heat and humidity resistances of the PVA base film is to add a second constituent which is a material to be cross-linked with the hydrophilic —OH groups in PVA. For example, both China patents published No. 1979231 A and 101281267A employ dicarboxylic acids and boric acids to have the PVA base film cross-linked. Nevertheless, boric acids increase the toughness of the PVA base film which will limit its extension percentage during a stretching process. Others use vacuum coating or ion sputtering method to have silicon dioxides ($SiO_2$) plated on the PVA base film in order to improve its heat and humidity resistances, but costs for both coating methods of silicon dioxide film are relatively high, and a problem with compatibility between silicon dioxides and the PVA base film also arises.

Therefore, a new PVA base film is required in the hope that it features relatively higher heat and humidity resistances, stability and mechanical performance, and at the same time with lower defective percentage of polarizers and have anti-glare function.

SUMMARY OF THE INVENTION

A first object of the present invention is to provide a method for preparing a base film of modified polyvinyl alcohol.

To achieve the above object, the present invention provides a method for preparing a base film of modified polyvinyl alcohol, comprising preparation steps of:

(1) executing surface graft modification of nano-silicon dioxide particles with fluorinated silane to obtain a modified nano-silicon dioxide powder;

(2) adding the modified nano-silicon dioxide powder obtained from the step (1) and an anionic carboxylate fluorocarbon surfactant to an aqueous solution of polyvinyl alcohol polymer, in order to prepare a composite solution of polyvinyl alcohol polymer, and (3) pouring the composite solution of polyvinyl alcohol polymer prepared from the step (2) onto a surface of a casting substrate, in order to obtain a base film of modified polyvinyl alcohol;

wherein the fluorinated silane in the step (1) is selected from the group consisting of dodecafluoro-heptyl-propyl-trimethoxy-silane, dodecafluoro-heptyl-propyl-methyl-dimethoxy-silane, tetramethyl-(perfluoro-hexyl-ethyl)propyl-trimethoxy-silane, tridecafluoro-octyl-trimethoxy-silane and mixtures thereof, and the content of the added fluorinated silane is from 33% to 40% by weight, based on the weight of the nano-silicon dioxide; and wherein a molecular formula of the anionic carboxylate fluorocarbon surfactant in the step (2) is RF—$CH_2$—COOH, wherein R represents a carbon chain of $C_6$ to $C_{10}$, and the content of the added modified silicon dioxide powder is from 4% to 8% by weight, based on the weight of the polyvinyl alcohol polymer.

In an embodiment of the present invention, the particle diameter of each of the nano-silicon dioxide particles in the step (1) is between 35 and 45 nm.

In an embodiment of the present invention, the content of the surfactant added in the step (2) is from 0.2% to 0.3% by weight, based on the weight of the polyvinyl alcohol polymer.

A first object of the present invention, the present invention further provides a method for preparing a base film of modified polyvinyl alcohol, comprising preparation steps of:
(1) executing surface graft modification of nano-silicon dioxide particles with fluorinated silane to obtain a modified nano-silicon dioxide powder;
(2) adding the modified nano-silicon dioxide powder obtained from the step (1) to an aqueous solution of polyvinyl alcohol polymer, in order to have a composite solution of polyvinyl alcohol polymer prepared; and
(3) pouring the composite solution of polyvinyl alcohol polymer prepared from the step (2) onto a surface of a casting substrate, and then vacuum drying it to a constant weight to obtain a base film of modified polyvinyl alcohol (PVA).

In an embodiment of the present invention, specific steps of the method for preparing a base film of modified polyvinyl alcohol include:
(1) executing surface graft modification of nano-silicon dioxide particles with fluorinated silane: adding dried nano-silicon dioxide particles, anhydrous ethanol, deionized water, ammonia and fluorinated silane into a round-bottom flask in turn; after ultrasonic dispersion and then stirring in high speed; executing filtration and deposition, washing with anhydrous ethanol repeatedly; then extracting with toluene to remove unreacted fluorinated silane; finally vacuum drying to a constant weight, and grinding to obtain a modified nano-silicon dioxide powder;
(2) adding the modified silicon dioxide powder obtained from the step (1) and a surfactant to an aqueous solution of polyvinyl alcohol polymer, and dispersing by ultrasonic at room temperature; and then stirring in high speed, in order to prepare a composite solution of polyvinyl alcohol polymer;
(3) pouring the composite solution of polyvinyl alcohol polymer prepared from the step (2) onto a surface of a cast substrate, and vacuum drying under 80° C.-90° C. to a constant weight, so as to obtain a base film of modified polyvinyl alcohol (PVA).

In an embodiment of the present invention, the fluorinated silane in the step (1) is selected from the group consisting of dodecafluoro-heptyl-propyl-trimethoxy-silane, dodecafluoro-heptyl-propyl-methyl-dimethoxy-silane, tetramethyl-(perfluoro-hexyl-ethyl)propyl-trimethoxy-silane, tridecafluoro-octyl-trimethoxy-silane and mixtures thereof.

In an embodiment of the present invention, the purity specification of nano-silicon dioxide particles in the step (1) is analytical degree pure reagent, and particle diameter thereof is between 35 and 45 nm.

In an embodiment of the present invention, the content of the fluorinated silane added in the step (1) is from 33% to 40% by weight, based on the weight of the nano-silicon dioxide.

In an embodiment of the present invention, the degree of polymerization of the polyvinyl alcohol polymer in the step (2) is 4000 and its degree of alcoholysis is 98%.

In an embodiment of the present invention, the content of the modified silicon dioxide powder added in the step (2) is from 4% to 8% by weight, based on the weight of the polyvinyl alcohol polymer.

In an embodiment of the present invention, an anionic carboxylate fluorocarbon surfactant is further added in the step (2), and a molecular formula thereof is $RF-CH_2-COOH$, wherein R represents a carbon chain of $C_6$ to $C_{10}$.

In an embodiment of the present invention, the content of the surfactant added in the step (2) is from 0.2% to 0.3% by weight, based on the weight of the polyvinyl alcohol polymer.

A second object of the present invention is to provide a base film of modified polyvinyl alcohol prepared from the abovementioned preparation method.

In order to achieve the abovementioned object, the present invention discloses a technical solution, as follows:

A base film of modified polyvinyl alcohol, the base film of modified polyvinyl alcohol comprises polyvinyl alcohol polymer, nano-silicon dioxide groups and fluorinated silane groups, the base film of modified polyvinyl alcohol has a general formula shown as below:

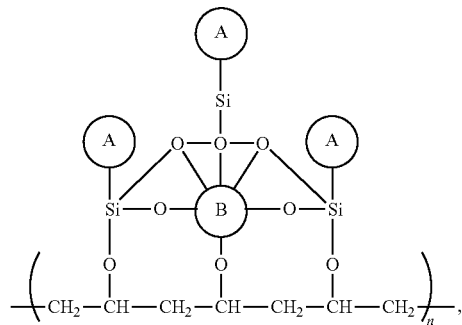

wherein:
(A) groups represent the fluorinated silane groups, the fluorinated silane groups are selected from the group consisting of dodecafluoro-heptyl-propyl-trimethoxy-silane, dodecafluoro-heptyl-propyl-methyl-dimethoxy-silane, tetramethyl(perfluoro-hexyl-ethyl)propyl-tri methoxy-silane, tridecafluoro-octyl-trimethoxy-silane and mixtures thereof; and (B) group represents nano-silicon dioxide group.

In an embodiment of the present invention, by dyeing with an iodine solution, iodine molecules are bonded in the polyvinyl alcohol polymer, wherein the nano-silicon dioxide group connected with the fluorinated silane groups is coated on and outside the polyvinyl alcohol polymer and the iodine molecules.

A third object of the present invention is to provide a polarizer made of the abovementioned base film of modified polyvinyl alcohol.

In order to achieve the abovementioned object, the present invention discloses technical plans as follow: a polarizer, comprising: the abovementioned base film of modified polyvinyl alcohol; and a protection film adhered on one surface or two surfaces of the polarizing film, the protection film for example is a triacetate cellulose (TAC) film. The base film of modified polyvinyl alcohol and the protection film adhered on one surface or two surfaces of the base film of modified polyvinyl alcohol commonly form a polarizer of the base film of modified polyvinyl alcohol.

The present invention has the following positive effects:

1) Heat and humidity resistances as well as stability of the base film of modified polyvinyl alcohol (PVA) are enhanced:

Low surface energy fluorinated groups migrate and aggregate toward a surface of the PVA base film, so that the PVA base film will feature excellent water, oil and corrosion resistances. Furthermore, the bond energy of C—F bonds is strong, and the bonds are very closely arranged on an outer layer of a carbon skeleton, so that fluoride polymers have excellent stability against heat.

2) Mechanical performance of the PVA base film is enhanced:

Nano-silicon dioxide has high rigidity, and has characteristics of high strength, high toughness, and high stability under high temperatures, and a 3-dimensional network is formed when combined with a high polymer chain of PVA, so that the mechanical strength, elasticity and abrasion resistance of the PVA base film are substantially enhanced. On the other hand, easily damaged iodine molecules are protected when they are coated with nano-silicon dioxide particles grafted with long-chain fluorinated silicon groups, so as to enhance the mechanical stability of the PVA polarizing film.

3) Defective percentage of polarizers is reduced:

The acting force between polymer molecules of C—F bonds of fluorinated materials is weak and therefore has excellent sticking-resistance and surface self-cleaning performance. During later-staged adhering process of the PVA base film and other membrane layers, it can effectively prevent foreign substances from entering, as a result, the defective percentage of polarizers can be reduced.

4) Anti-glare function is obtained:

In existing processes, in order that the PVA base film is protected because of its hydrophilic property, a protective film of triacetate cellulose (TAC) with high light transmission rate, excellent waterproof characteristic and a certain degree of mechanical strength is composited on each of two sides of the PVA base film. However, the size of this type of protective film can easily be changed under high temperatures and humidity, and thus its mechanical performance is weakened and its protective performance is also affected. The present invention can substantially enhance the heat and humidity resistances as well as the mechanical strength of the PVA base film, even that the TAC film can be omitted (i.e. the PVA base film can be directly used as a polarizer). Furthermore, a certain degree of roughness can be formed on the surface of the PVA base film by controlling the sizes of nano-silicon dioxide particles, and thus images are diffused and reflected by the concave and convex shapes thereof in order to prevent the light from being overly-concentrated to cause discomfort in viewing, as a result, an anti-glare function is achieved.

Figure 1:
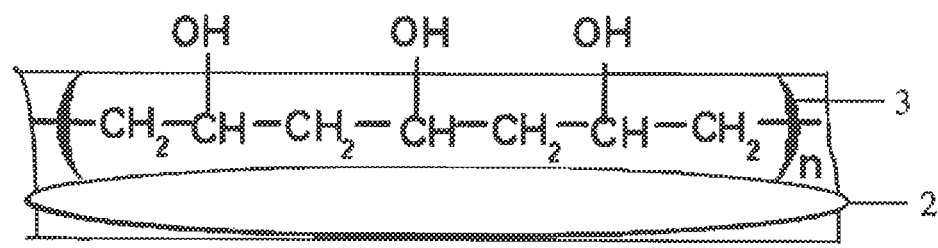
FIG. 1 is an illustration of a molecular structure of a PVA base film of an existing iodine polarizer.

Wherein: numeral 1 is nano-silicon dioxide group, numeral 2 is iodine molecule, numeral 3 is polyvinyl alcohol (PVA) polymer, and numeral 4 is fluorinated silane group.

DETAILED DESCRIPTION OF THE PREFERRED EMBODIMENTS

The structure and the technical means adopted by the present invention to achieve the above and other objects can be best understood by referring to the following detailed description of the preferred embodiment and the accompanying drawings, but should not be construed as limitations thereof.

According to a preferred embodiment of the present invention, the present invention provides a base film of modified polyvinyl alcohol (PVA) and its preparation method, wherein its specific preparation steps include:

(1) Surface graft modification of nano-silicon dioxide particles using fluorinated silane: 6 g of dried nano-silicon dioxide particles, 120 ml of anhydrous ethanol, 6.5 g of deionized water, 3.4 g of ammonia of 25% weight percentage and 2.0-2.4 g of dodecafluoro-heptyl-propyl-trimethoxy-silane are added in a round-bottom flask in turn; after 1 hour of ultrasonic dispersion and then stirring in high speed for 5 hours under 40° C., processing with filtration and deposition, washing with anhydrous ethanol repeatedly; then extracting with toluene for 16 hours to remove unreacted dodecafluoro-heptyl-propyl-trimethoxy-silane; vacuum drying to a constant weight, and grinding to obtain a white modified nano-silicon dioxide powder, wherein condensation polymerization occurred between hydroxyl groups (—OH) generated by hydrolysis of —OCH$_3$ groups which are connected to Si in dodecafluoro-heptyl-propyl-trimethoxy-silane, and hydroxyl groups (—OH) on the surfaces of the nano-silicon dioxide particles, thus Si—O—Si bonds are formed. In the Si—O—Si bonds, the binding force between Si and O is stronger than that between silicon and oxygen in the connection of Si and —OH, therefore fluorinated silane can be reacted with nano-silicon dioxide particles.

(2) The modified nano-silicon dioxide powder obtained from the step (1) and an anionic carboxylate fluorocarbon surfactant (RF—CH$_2$—COOH) are added to an aqueous solution of polyvinyl alcohol (PVA) polymer, and dispersed by ultrasonic at room temperature for 1 hour; then stirring in high speed for 5 hours under 40° C., in order to prepare a composite solution of polyvinyl alcohol (PVA) polymer. Steric hindering effect between particles is enhanced by the modified nano-silicon dioxide particles which thus can be evenly distributed in a system; on the other hand, there are still some —OH on the surface of the hydrolytic fluorinated silane and the surface of the modified nano-silicon dioxide particles, which can be further cross-linked and condensed with the —OH in the long molecular chain of PVA.

(3) The composite solution of polyvinyl alcohol polymer prepared from the step (2) is poured on a surface of a casting substrate, and vacuum drying under 80° C.~90° C. is kept until a constant weight is reached, so as to obtain a base film of modified polyvinyl alcohol (PVA).

Wherein, the fluorinated silane is selected from dodecafluoro-heptyl-propyl-trimethoxy-silane, but not limited thereto, the fluorinated silane may be selected from the group consisting of dodecafluoro-heptyl-propyl-trimethoxy-silane, dodecafluoro-heptyl-propyl-methyl-dimethoxy-silane, tetramethyl-(perfluoro-hexyl-ethyl)propyl-trimethoxy-silane, tridecafluoro-octyl-trimethoxy-silane and mixtures thereof.

Wherein, the purity specification of nano-silicon dioxide particles is analytical degree pure reagent, and the particle diameter is between 35 and 45 nm; the degree of polymerization of polyvinyl alcohol polymer is 4000 and its degree of alcoholysis is 98%.

Wherein, the content of the fluorinated silane is from 33% to 40% by weight, based on the weight of the nano-silicon dioxide.

The content of the modified silicon dioxide powder added in the step (2) is from 4% to 8% by weight, based on the weight of the polyvinyl alcohol polymer; the molecular formula of the anionic carboxylate fluorocarbon surfactant added in the step (2) is RF—CH$_2$—COOH, wherein R represents a carbon chain of $C_6$ to $C_{10}$. The content of the added surfactant is from 0.2% to 0.3% by weight, based on the weight of the polyvinyl alcohol polymer.

The obtained modified PVA base film is used as a substrate material. After being dyed in iodine and stretched uniaxially as conventionally used in prior arts, a modified PVA base film of a polarizer is prepared as shown in a molecular structure in FIG. 2, and it comprises polyvinyl alcohol (PVA) polymer 3, iodine molecules 2, a nano-silicon dioxide group 1 and fluorinated silane groups 4.

Figure 2:
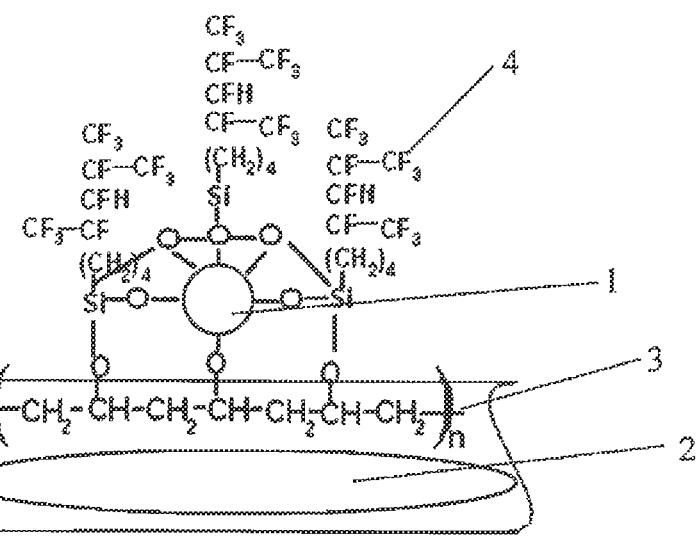
FIG. 2 is an illustration of a molecular structure of a PVA base film of a polarizer of a preferred embodiment of the present invention.

More specifically, as shown in FIG. 2, wherein the nano-silicon dioxide group 1 is grafted and modified by dodecafluoro-heptyl-propyl-trimethoxy-silane; after treated with a certain dispersing means, the grafted and modified nano-silicon dioxide group 1 is evenly dispersed in the PVA base film and combined with a high polymer chain of the polyvinyl alcohol (PVA) polymer 3 to form a three-dimensional network structure, and organic and inorganic nano-composite materials are obtained. The organic and inorganic nano-composite materials are incorporated with the excellent characteristics of the PVA base film and nano materials. Fluorinated materials are materials with the lowest surface energy discovered so far, low surface energy fluorinated groups migrate and aggregate towards a surface of the PVA base film, with only a very little amount, the surface of the PVA base film will feature excellent hydrophobic, oleophobic, sticking-resistant and self-cleaning performances. Furthermore, rigid nano-silicon dioxide particles allow the PVA base film to have excellent capabilities of heat resistance and mechanical stability. Better compatibility of organic and inorganic can be achieved from organic and inorganic nano-composite materials prepared from silicon dioxides modified by organic fluorinated silane.

More specifically, in the present invention, during a heating process, low surface energy fluorinated groups migrate and aggregate towards a surface of the PVA base film, so that the PVA base film will feature excellent water, oil and corrosion resistances. Furthermore, the bond energy of C—F bonds is strong, and the bonds are very closely arranged on an outer layer of a carbon skeleton, so that fluoride polymers have excellent stability against heat.

The nano-silicon dioxide group has high rigidity, and has characteristics of high strength, high toughness, and high stability under high temperatures, and a 3-dimensional network is formed when combined with a high polymer chain of PVA, so that the mechanical strength, elasticity and abrasion resistance of the PVA base film are substantially enhanced. On the other hand, easily damaged iodine molecules are protected when they are coated with nano-silicon dioxide particles grafted with long-chain fluorinated silicon groups, which enhances the mechanical strength and stability of the PVA base film.

The acting force between the polymer molecules of C—F bonds of fluorinated materials is weak and therefore has excellent sticking-resistance and surface self-cleaning performance. During later-staged adhering process of the PVA base film and other membrane (e.g. TAC film) layers, it may effectively prevent foreign substances from entering, as a result, the defective percentage of polarizers can be reduced.

A certain degree of roughness can be formed on the surface of the polarizer by controlling the sizes of nano-silicon dioxide particles, and thus images are diffused and reflected by the concave and convex shapes, in order to prevent the light from being overly-concentrated to cause discomfort in viewing, as a result, an anti-glare function is achieved.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A method for preparing a base film of modified polyvinyl alcohol polymer, comprising the following steps of:
    (1) modifying nano-silicon dioxide particles with a fluorinated silane by a surface graft modification to obtain a modified nano-silicon dioxide powder;
    (2) adding the modified nano-silicon dioxide powder obtained from the step (1) into an aqueous solution of polyvinyl alcohol polymer to form a composite solution of polyvinyl alcohol polymer;
    (3) pouring the composite solution of polyvinyl alcohol polymer prepared from the step (2) onto a surface of a casting substrate, in order to obtain a base film of modified polyvinyl alcohol polymer; and
    (4) bonding iodine molecules to the polyvinyl alcohol polymer in the base film of modified polyvinyl alcohol polymer by dyeing with an iodine solution.

2. The method for preparing a base film of modified polyvinyl alcohol polymer as claimed in claim 1, wherein the fluorinated silane in the step (1) is selected from the group consisting of dodecafluoro-heptyl-propyl-triinethoxy-silane, dodecafluoro-heptyl-propyl-methyl-dimethoxy-silane, tetramethyl-(perfluoro-hexyl-ethyl)propyl-trimethoxy-silane, tridecafluoro-octyl-trimethoxy-silane and mixtures thereof.

3. The method for preparing a base film of modified polyvinyl alcohol polymer as claimed in claim 1, wherein the particle diameter of each of the nano-silicon dioxide particles in the step (1) is between 35 and 45 nm.

4. The method for preparing a base film of modified polyvinyl alcohol polymer as claimed in claim 1, wherein the content of the fluorinated silane added in the step (1) is from 33% to 40% by weight, based on the weight of the nano-silicon dioxide.

5. The method for preparing a base film of modified polyvinyl alcohol polymer as claimed in claim 1, wherein the content of the modified nano-silicon dioxide powder added in the step (2) is from 4% to 8% by weight, based on the weight of the polyvinyl alcohol polymer.

6. The method for preparing a base film of modified polyvinyl alcohol polymer as claimed in claim 1, wherein an anionic carboxylate fluorocarbon surfactant is further added in the step (2), and the molecular formula thereof is $RF-CH_2-COOH$, wherein R represents a carbon chain of $C_6$ to $C_{10}$.

7. The method for preparing a base film of modified polyvinyl alcohol polymer as claimed in claim 6, wherein the content of the surfactant added in the step (2) is from 0.2% to 0.3% by weight, based on the weight of the polyvinyl alcohol polymer.

* * * * *